United States Patent
Tseng et al.

(10) Patent No.: US 6,967,311 B1
(45) Date of Patent: Nov. 22, 2005

(54) SMOLDER POT WITH TEMPERATURE CONTROL FUNCTION

(76) Inventors: Rong-Yuan Tseng, 235 Chung-Ho Box 8-24, Taipei (TW); Kuo-I Lin, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/881,137

(22) Filed: Jul. 1, 2004

(51) Int. Cl.[7] .................. A47J 27/026; A47J 27/00
(52) U.S. Cl. ............... 219/430; 219/439; 220/573.1; 99/403
(58) Field of Search ............... 219/430, 438, 219/439; 99/403; 220/573.1, 574.2

(56) References Cited

U.S. PATENT DOCUMENTS

| | | | |
|---|---|---|---|
| 887,923 A | 5/1908 | Crandall | 219/523 |
| 2,378,772 A | 6/1945 | Hummel | 392/447 |
| 4,024,377 A * | 5/1977 | Henke | 219/439 |
| 5,073,699 A * | 12/1991 | Box | 219/433 |
| 5,507,220 A * | 4/1996 | Jung | 99/403 |

FOREIGN PATENT DOCUMENTS

| | | | |
|---|---|---|---|
| DE | 3149119 A | | 7/1983 |
| FR | 21983 A | | 4/1921 |
| JP | 54100549 A | | 8/1979 |
| JP | 63210552 A | | 9/1988 |
| JP | 03187182 | | 8/1991 |
| JP | 03198818 A | * | 8/1991 |
| JP | 08215036 A | * | 8/1996 |

* cited by examiner

Primary Examiner—Joseph Pelham (57) ABSTRACT

A smolder pot capable of cooking food as heat source is removed. The smolder pot comprises a cooking pot. At least one heat accumulating disk is fixed to a center of a bottom of the cooking pot; the heat accumulating disk being retained with a gap from the bottom. When the bottom of the cooking pot is heat, the heat accumulating disk will be heated. Due to the gap between the heat accumulating disk and the bottom, no heat is transferred to the cooking pot directly. Thus the temperature of the heat accumulating disk is not effect by the heat dissipating of liquid in the cooking pot. Thereby the heat accumulating effect of the heat accumulating disk is helpful to the heating and temperature retaining of the cooking pot.

12 Claims, 11 Drawing Sheets

SMOLDER POT WITH TEMPERATURE CONTROL FUNCTION

FIELD OF THE INVENTION

The present invention relates to pots, and particularly to a smolder pot which can control the temperature by the number of heat accumulating disks.

BACKGROUND OF THE INVENTION

Figure 1:
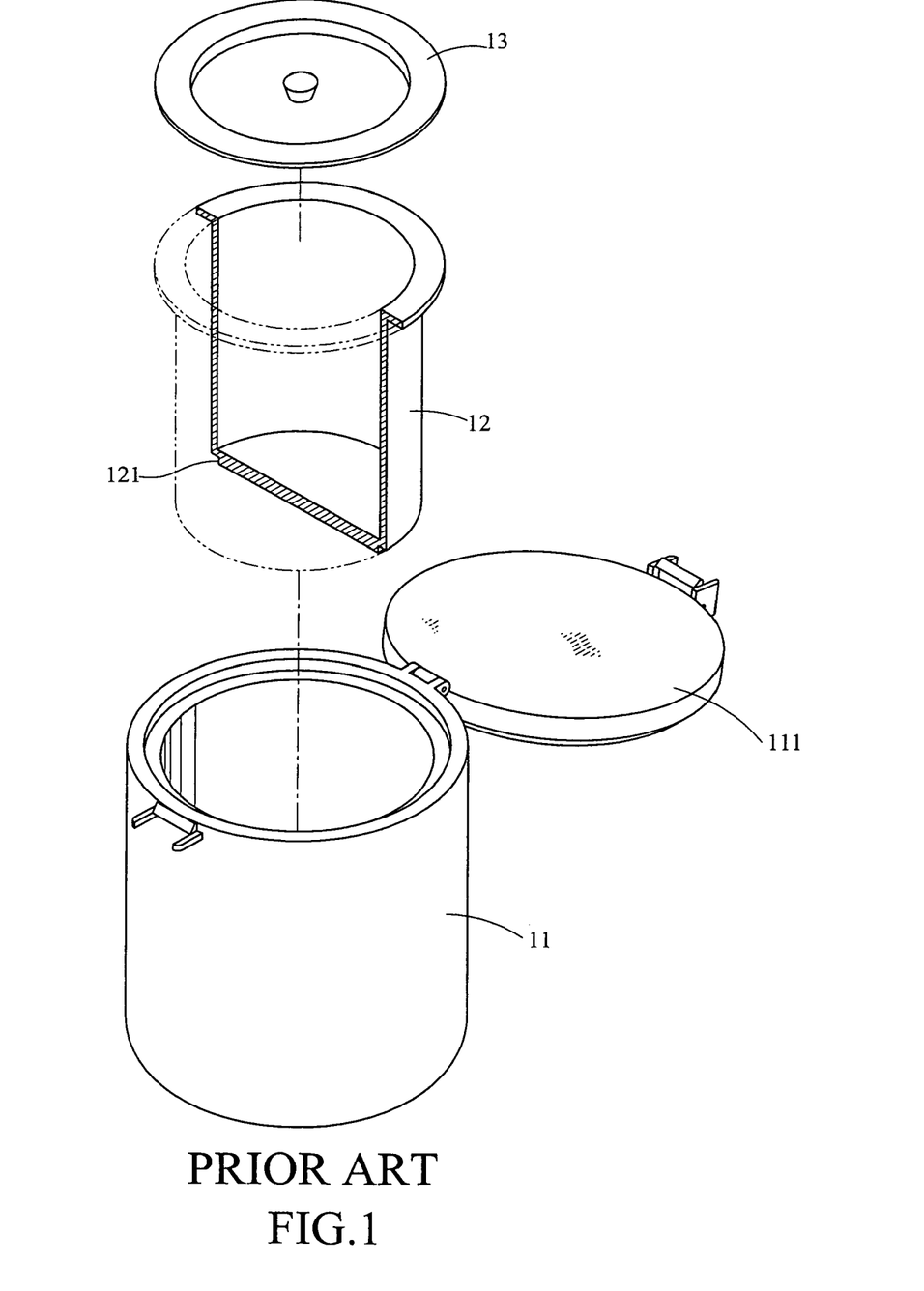
FIG. 1 is an exploded perspective view of the prior art smolder pot.
Figure 2:
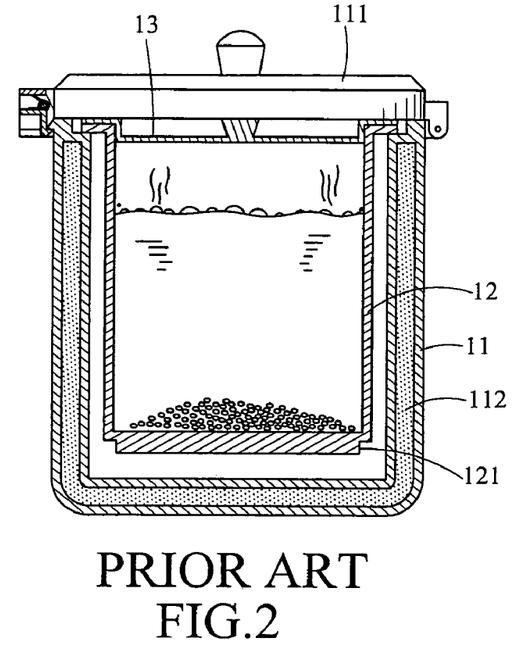
FIG. 2 is a cross sectional view of the smolder pot of FIG. 1.

The smolder pot, see FIG. 1, has the function for continuously heating or retaining temperature of an object within the pot as the heat source is removed. In FIG. 1, the smolder pot has an outer pot 11 and a cooking pot 12 within the outer pot 11. FIG. 2 is an assembled view of the prior art smolder pot. The outer pot 11 has a hollow heat isolating temperature retaining layer 112 so as to have heat isolating and temperature retaining functions. A top of the cooking pot 12 resists against an upper edge of the outer pot 11. A bottom and annular wall of the cooking pot 12 are retained with proper gaps with the outer pot 11. A cover 13 covers the cooking pot 12. The outer pot 11 is sealed by the sealing cover 111. Since the outer pot 11 has heat isolation effect, heat can be retained in the pot. Thus the food within the cooking pot 12 is smoldered and it has the function of temperature retaining for a longer time period.

However to make the cooking pot 12 has a preferred heat and temperature retaining functions, in some smolder pots, the bottom of the cooking pot 12 is thickened to has a thickened layer 121. When the layer 121 is heated, the temperature of the bottom will increase so as to have preferred heat and temperature retaining effects, while the heat energy can be absorbed by the food within the cooking pot 12. Thereby temperature can be reduced quickly and thus the improvement is limited.

Figure 3:
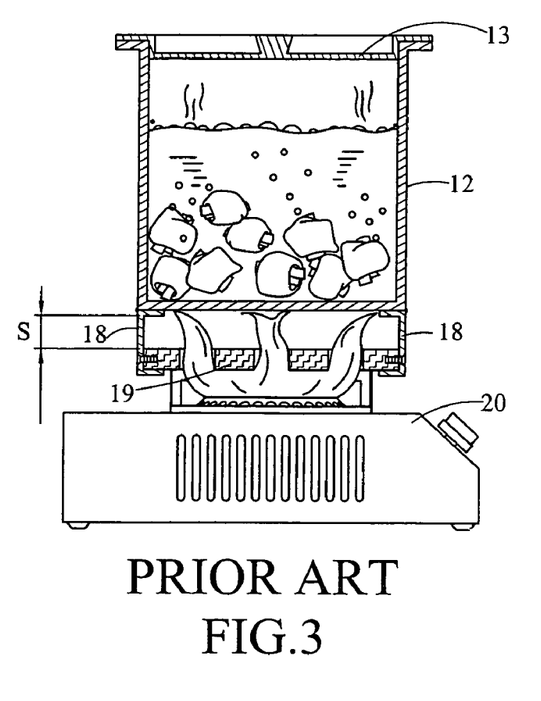
FIG. 3 is a cross sectional view of a prior art cooking pot.

One development is disclosed for improving the defect in the prior art. Referring to FIG. 3, a plurality of retaining sheets 18 are annularly arranged at the bottom of the cooking pot 12. A heat accumulating disk 19 is fixed below the retaining sheets 18. A gap S is retained between the heat accumulating disk 19 and the cooking pot 12. When the cooking pot 12 is placed upon a heat source 20 (a hot plate) for burning, fire will pass through a through hole 191 of the heat accumulating disk 19 to heat the bottom of the pot. When the food within the pot boils is at a temperature about 90° C., the temperature of the heat accumulating disk 19 is about 500~600° C. Due to the gap S between the heat accumulating disk 19 and the cooking pot 12, heat will not transfer to the cooking pot 12. Because the cooking pot 12 is placed within the outer pot 11, the heat accumulating disk 19 can heat the cooking pot 12 so that food can cook thoroughly so that the smoldering time is reduced and the fuel is saved.

Above mentioned prior art has the following defects. Only one sheet of heat accumulating disk is fixed to the bottom. When the cooking pot is placed within the outer pot, the effect of increasing the temperature is preferred than the prior art so as to reduce the smoldering time. However the carelessness of the user will prolong the smolder time, as a result, the food will be overheated. Moreover, since the heat accumulating disk has a flat bottom, when the smolder pot is placed to a table will destroy the table because the temperature of the heat accumulating disk is about 500~600° C. so as to damage the table or a pad on the table. The heat accumulating disk is fixed below the cooking pot, which can not be detached and the number of the heat accumulating disk is predetermined and thus the temperature can not be controlled. In general, the burning ratio of the gas is about 70 to 80%, since the gas does not burn completely, gas is mixed in air. When the gas passes through the heat accumulating disk, the gas almost burns completely. When the numbers of the through holes are too large or too little, a desired effect can not be achieved.

SUMMARY OF THE INVENTION

Accordingly, the primary object of the present invention is to provide a smolder pot which can control the temperature by the number of heat accumulating disks.

Another object of the present invention is to provide a smolder pot, wherein the gas can be burned completely by using the heat accumulating disks so as to protect the health of the user.

A further object of the present invention is to provide a smolder pot, wherein the cooking pot can not flatly place on a table surface so as to avoid that the user to place a cooking pot on a table so as to damage the table surface.

A further object of the present invention is to provide a smolder pot, wherein more power can be saved. To achieve above objects, the present invention provides a smolder pot capable of cooking food as heat source is removed. The smolder pot comprises a cooking pot. At least one heat accumulating disk is fixed to a center of a bottom of the cooking pot; the heat accumulating disk being retained with a gap from the bottom. When the bottom of the cooking pot is heat, the heat accumulating disk will be heated. Due to the gap between the heat accumulating disk and the bottom, no heat is transferred to the cooking pot directly. Thus the temperature of the heat accumulating disk is not effect by the heat dissipating of liquid in the cooking pot. Thereby the heat accumulating effect of the heat accumulating disk is helpful to the heating and temperature retaining of the cooking pot.

Moreover, the present invention provides a smolder pot capable of cooking food as heat source is removed. The smolder pot comprises a cooking pot; a safety ring below a bottom of the cooking pot; an inner wall of the safety ring has inner threads at least one heat accumulating disk; one of the at least one heat accumulating disk having outer threads at an outer edge thereof; the at least one heat accumulating disk being fixed to a center of a bottom of the cooking pot; the heat accumulating disk being retained with a gap from the bottom. When the bottom of the cooking pot is heat, the heat accumulating disk will be heated; due to the gap between the heat accumulating disk and the bottom, no heat is transferred to the cooking pot directly. Thus the temperature of the heat accumulating disk is not effect by the heat dissipating of liquid in the cooking pot; and thus the heat accumulating effect of the heat accumulating disk is helpful to the heating and temperature retaining of the cooking pot.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

First Embodiment

Figure 4:
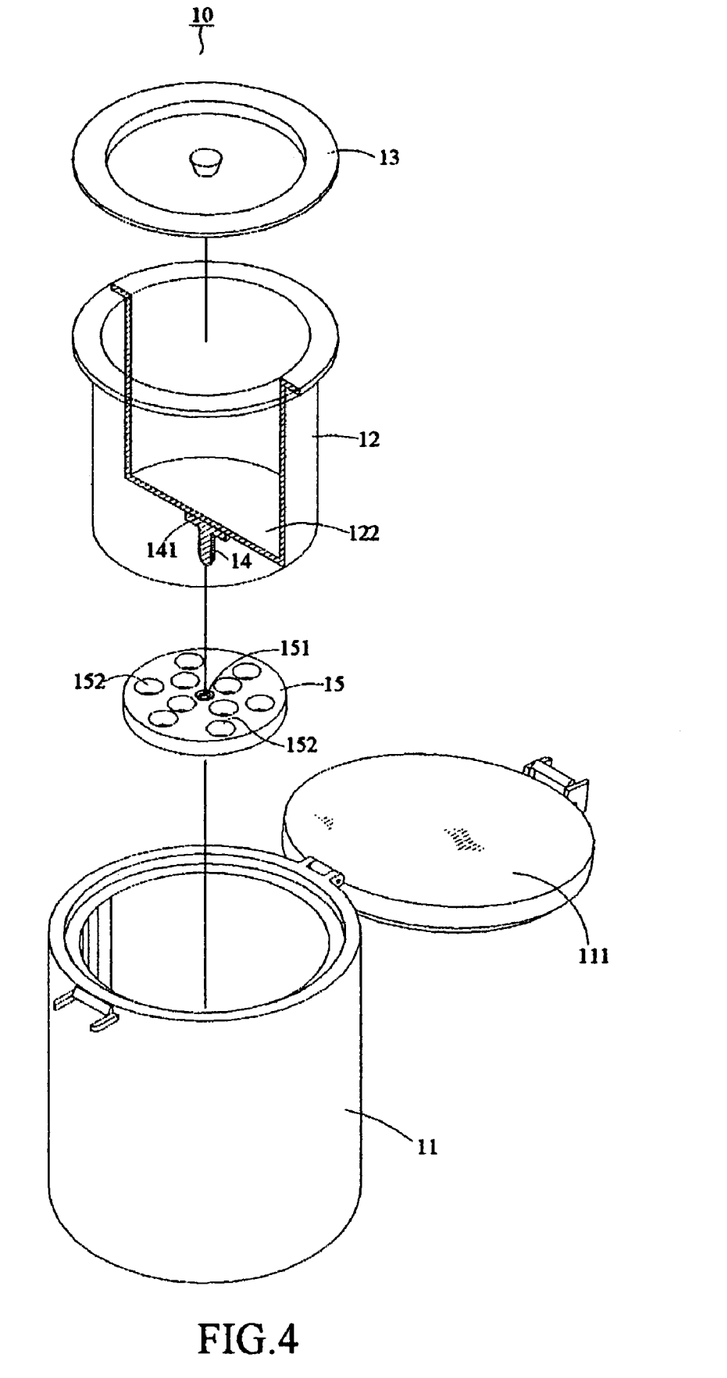
FIG. 4 is an exploded perspective view of smolder pot in the first embodiment of the present invention.
Figure 5:
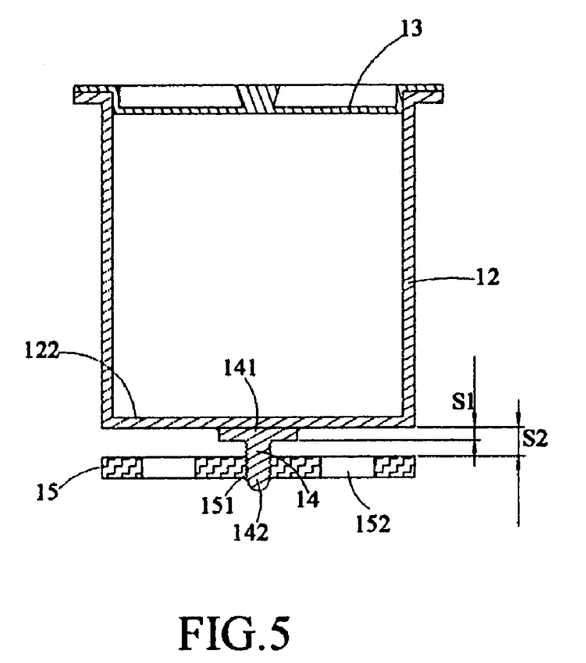
FIG. 5 is an assembled perspective view of the smolder pot in the first embodiment of the present invention.
Figure 6:
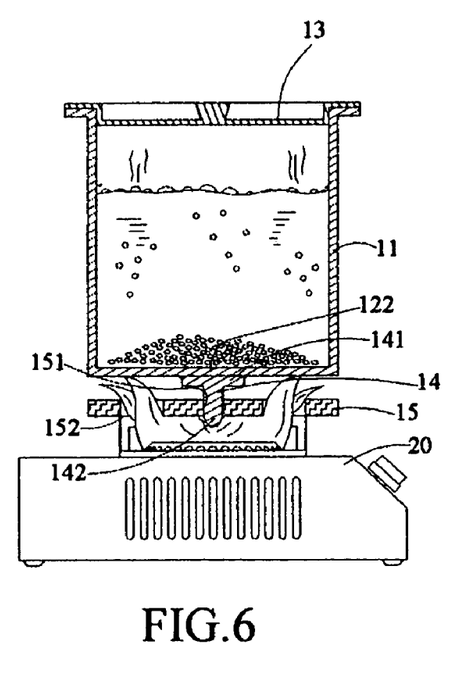
FIG. 6 is a schematic view showing the heating of the smolder pot in the first embodiment of the present invention.

With reference to FIGS. 4, 5, the smolder pot 10 of the present invention is illustrated. The smolder pot 10 has an outer pot 11 which is same as those used in the prior art and thus the details will not be described herein. The smolder pot 10 further comprises a cooking pot 12. The cooking pot 12 has a bottom 122. A center of the bottom has a heat accumulating disk 15. The heat accumulating disk 15 retains with a predetermined gap S2 with the bottom (referring to FIG. 6) so that when the cooking pot 12 is heated, the temperature of the heat accumulating disk 15 is higher than that of the cooking pot 12. This is because a predetermined gap is retained between the heat accumulating disk 15 and the bottom 122, heat can not be transferred to the cooking pot 12 directly. Thereby it is impossible that the temperature of the heat accumulating disk 15 can not increase due to heat dissipation from the interior of the smolder pot 10. When the cooking pot 12 is placed into the outer pot 11, by the heat accumulating effect of the heat accumulating disk 15, the temperature of the cooking pot 12 can be increased and the temperature can be retained for a longer time.

A bottom 122 of the cooking pot 12 is screwed with a center screw rod 14 for screwing a central screw hole of the heat accumulating disk 15. The maximum gap S2 between the heat accumulating disk 15 and the bottom 122 is S2. When the heat accumulating disk 15 screws upwards, it is stopped by a top block 141 at an upper end of the screw rod 14. The top block 141 has a diameter larger than that of the screw rod 14. The thickness S1 of the top block 141 is a minimum gap between the heat accumulating disk 15 and the bottom 122.

Figure 7:
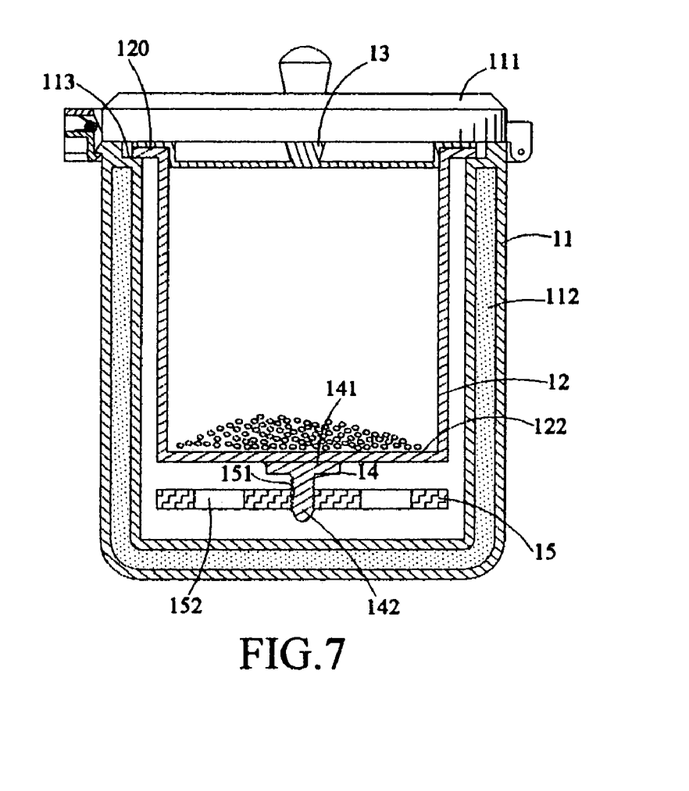
FIG. 7 is a schematic cross sectional view of the smolder pot in the first embodiment of the present invention.

If the cooking pot 12 is heated by a heat source 20 (such as a hot plate) for a time period, when the food within the smolder pot 10 has achieve a boiling temperature of about 95~100° C., the temperature of the heat accumulating disk 15 will achieve a temperature of about 500~600° C. At this moment, the cooking pot 12 is placed into the outer pot 11 (referring to FIG. 7), a top 120 of the cooking pot 12 will adhere to a top frame 113 so that the heat accumulating disk 15 will not contact the bottom of the outer pot 11. Since the temperature of the outer pot 11 is not 95~100° C., the heating effect of the heat accumulating disk 15 will have an effect of re-heating so that the temperature is increased to 100~110° C. or higher values. Therefore, the good can be cooked thoroughly with a shorter time. The temperature of the food can be retained for a longer time. Thus, the power is saved.

In above structure, a bottom end of the central screw rod 14 has a cambered end 142 which can not be screwed with the heat accumulating disk 15. Thereby it protrudes from a lower end of the heat accumulating disk 15. As a result, the cooking pot 12 can not be placed horizontally. Thus it alert the user not to placed a heated cooking pot 12 on a table so as to prevent the temperature to damage the heat accumulating disk 15 or table surface.

Figure 8:
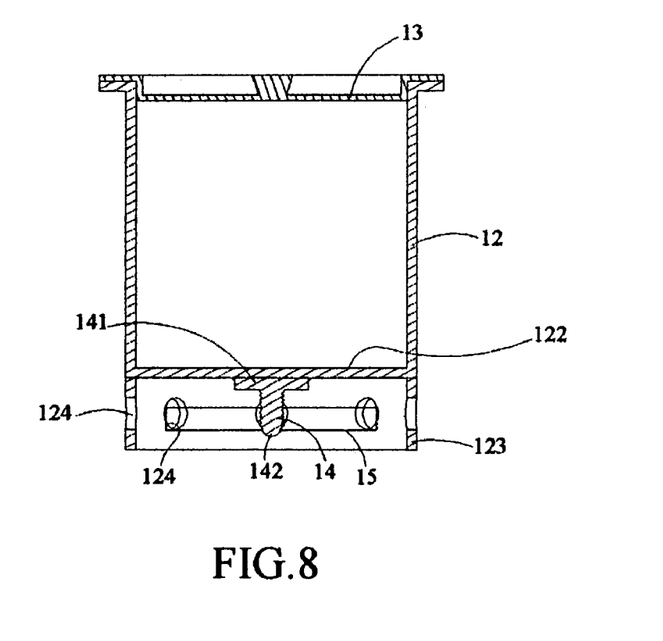
FIG. 8 is a cross sectional view about the safety ring installed in the smolder pot in the first embodiment of the present invention.

As shown in FIG. 8, another feature of the present invention is at a periphery of the bottom 122 is installed with a safety ring 123 which is enclosed as a hidden space for enclosing the heat accumulating disk 15 therewithin. A height of the safety ring 123 is higher than the thickness of the heat accumulating disk 15 so that when the cooking pot 12 is placed on a table or a temperature-retaining pad, it will not harm the table surface. Furthermore, to reduced the temperature of the safety ring 123, a plurality of through hole 124 can be installed on a wall surface.

Second Embodiment

Figure 9:
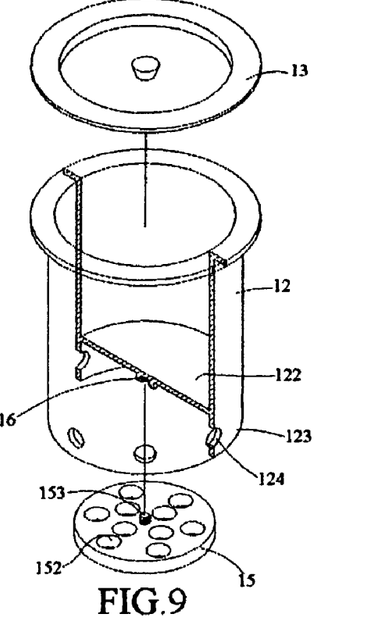
FIG. 9 is an exploded perspective view of the smolder pot of the second embodiment of the present invention.
Figure 10:
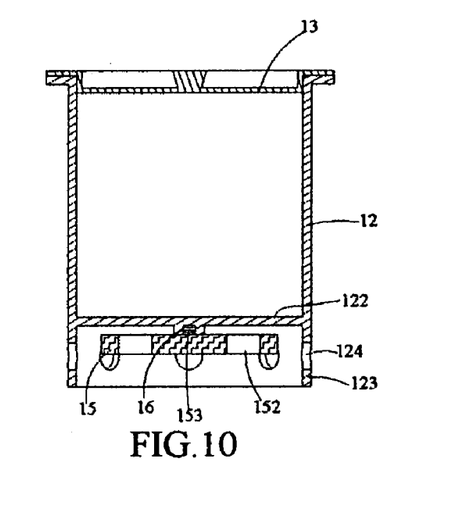
FIG. 10 is a schematic cross view of the cooking pot in the second embodiment of the present invention.

Referring to FIGS. 9, 10, in the second embodiment of the present invention, the difference of this embodiment from the above one is that a nut is installed at a bottom 122 of the cooking pot 12 so that a screw rod at a top center of the heat accumulating disk 15 can be screwed with the nut. Similarly, the heat accumulating disk 15 is retained with a predetermined distance from the bottom 122. Besides a periphery of the bottom 122 is installed with a safety ring 123.

Third Embodiment

Figure 11:
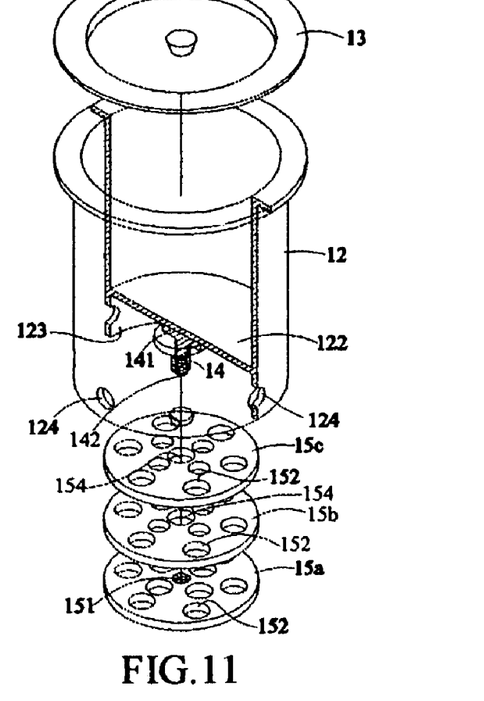
FIG. 11 is an exploded perspective view the smolder pot of the third embodiment of the present invention.
Figure 12:
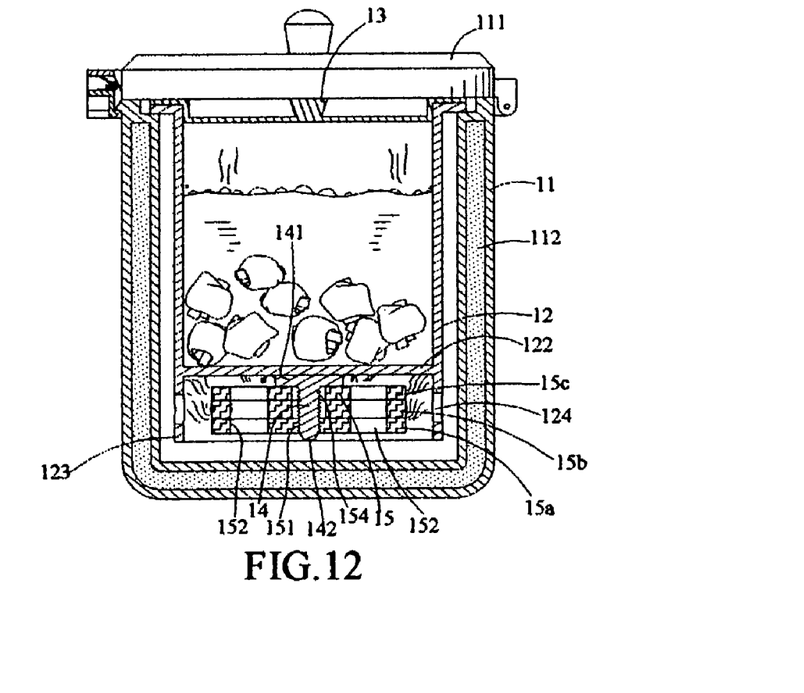
FIG. 12 is a schematic cross view of the smolder pot in the third embodiment of the present invention.

Referring to FIGS. 11 and 12, the third embodiment of the present invention is illustrated. The difference of this embodiment from the first embodiment is that a plurality of heat accumulating disks 15 can be stacked. In the drawings, there are three heat accumulating disks 15a–15c. Each heat accumulating disk 15a, 15b, 15c, has a via hole 152 for screwing a stud 14. After the three heat accumulating disks 15a, 15b, 15c are stacked, the via holes 152 are aligned. Thereby the heating fire can pass through the via hole to the bottom 122. Moreover, only the heat accumulating disk 15a at a lowest position has a screw hole, while the heat accumulating disks 15b, 15c have no screw hole so that the structure can be assembled and detached rapidly. Moreover, the via holes 152 of the three heat accumulating disks 15 can be aligned easily.

Furthermore, the number of the heat accumulating disk 15 can be increased or decreased as weighs. For example, the time for cooking beans is short, thus only one heat accumulating disk 15 is sufficient. If the heating time is long, for example, for meat, more than two heat accumulating disks are used. However this has the effect of saving power.

Fourth Embodiment

Figure 13:
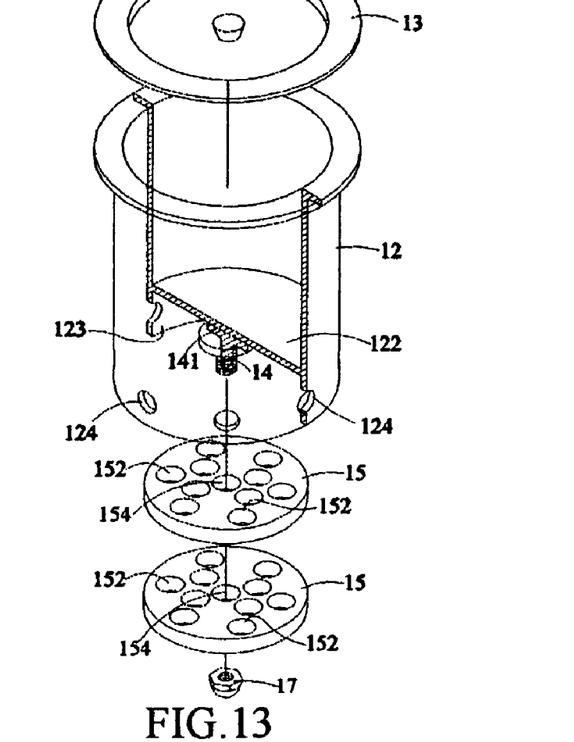
FIG. 13 is an exploded perspective view of the fourth embodiment of the present invention.
Figure 14:
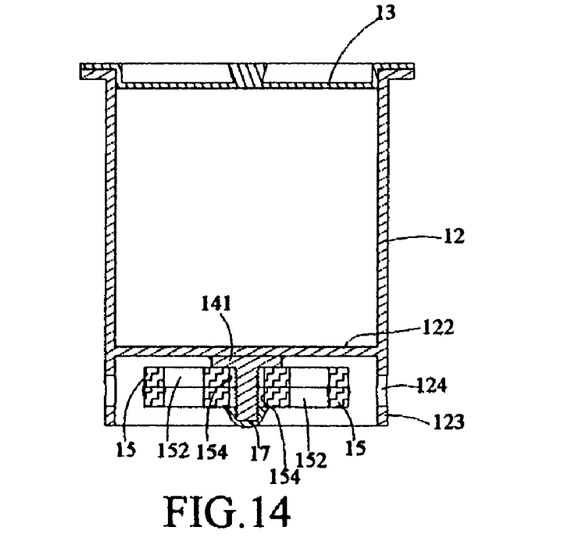
FIG. 14 is a schematic cross view of the cooking pot of the fourth embodiment of the present invention.
Figure 15:
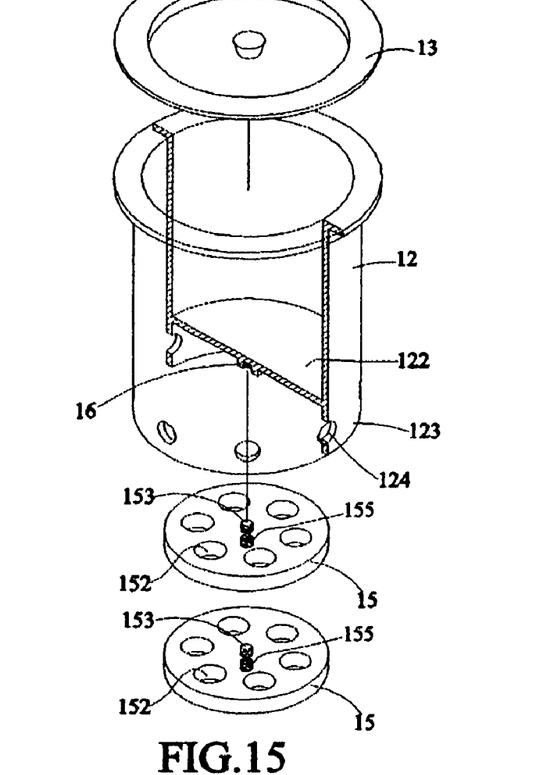
FIG. 15 is an exploded perspective view of the cooking pot of the fifth embodiment of the present invention.

With reference to FIGS. 13, 15, the fourth embodiment of the present invention is illustrated. The difference of this embodiment from the third embodiment is that the upper and lower heat accumulating disks 15 have respective central through holes 154 for screwing a screw rod 14. Then, a lower end of the screw rod 14 is screwed with a nut 17. Thereby the through holes 154 of the two heat accumulating disks 15 can be aligned easily for burning the bottom 122. Next, the nut 15 protrudes blow the heat accumulating disk 15 so that the cooking pot 12 can not be placed directly on a table surface. When the cooking pot 12 is installed with a safety ring 123, the cooking pot 12 can be placed on the table surface.

Fifth Embodiment

Figure 16:
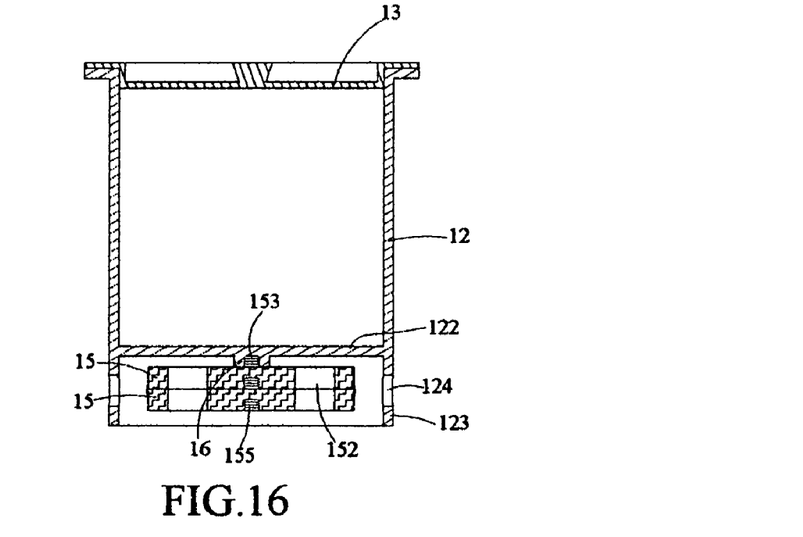
FIG. 16 is a schematic cross view about the cooking pot of the fifth embodiment of the present invention.

With reference to FIGS. 15, 16, the fifth embodiment of the present invention is illustrated. The difference of this embodiment from the second embodiment is that a central screw hole of an upper heat accumulating disk 15 is screwed with a screw rod 153 at a top surface of the lower heat accumulating disk. That is, screw technology serves to connect the heat accumulating disks 15. A gap is formed between the upper heat accumulating disk 15 and the bottom 122.

Sixth Embodiment

Figure 17:
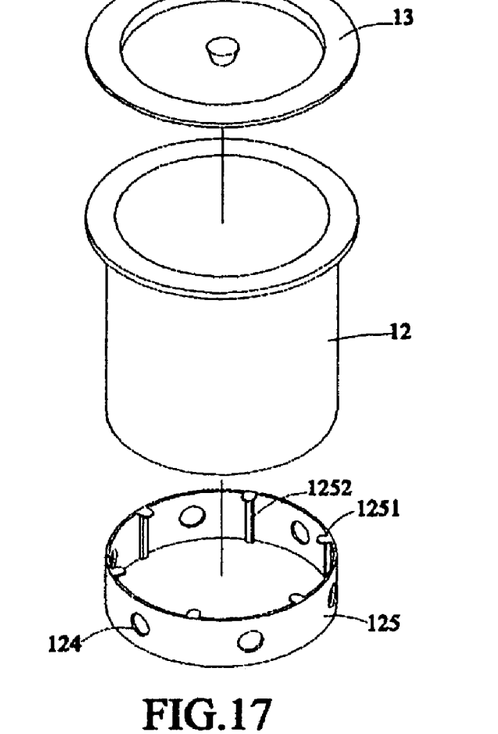
FIG. 17 is an exploded perspective view about the cooking pot of the sixth embodiment of the present invention.
Figure 18:
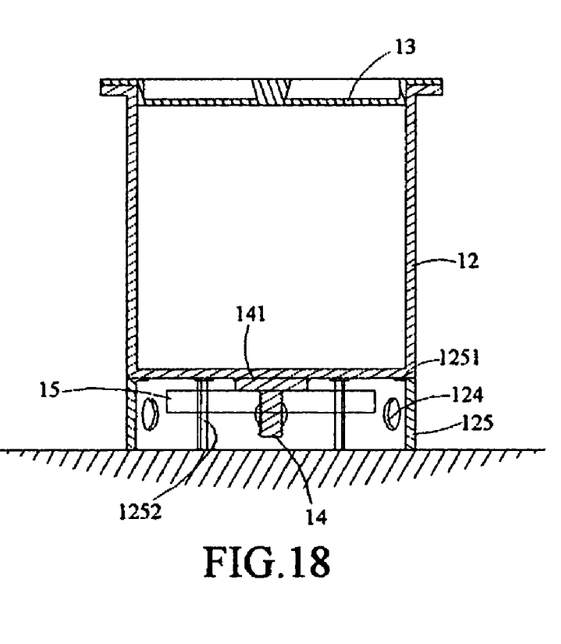
FIG. 18 is a schematic cross view about the cooking pot of the sixth embodiment of the present invention.

With reference to FIGS. 17, 18, the sixth embodiment of the present invention is illustrated. The difference of this embodiment from the above embodiments is that the safety ring 125 is separated from the cooking pot 12. A thin safety ring 123 is welded to a periphery of the bottom 122. The safety ring 125 is made of aluminum and lead alloy and has a plurality of protruding stopping edges 1251. An inner wall of the safety ring 125 is protruded with a plurality of ribs 1252. Since the wall of the safety ring 125 is thin, it has a preferred heat dissipating effect than the safety ring 123 disclosed in FIG. 8. As it is placed on a table surface, the damage of the table surface can be reduced.

Seven Embodiment

Figure 19:
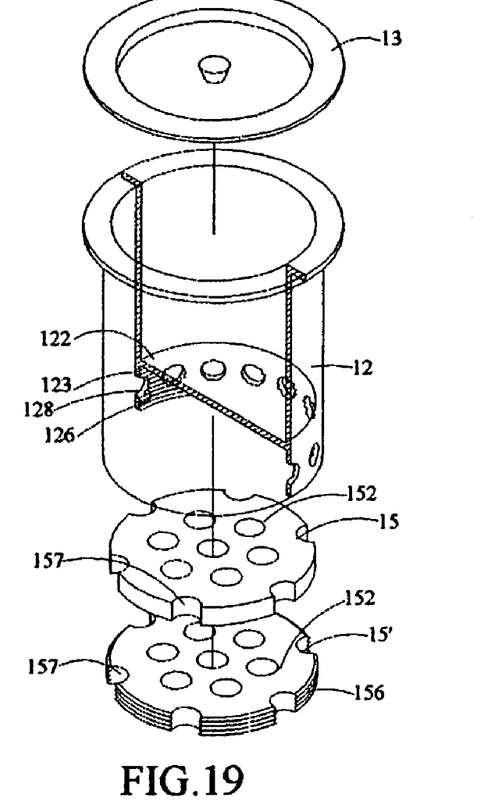
FIG. 19 is an exploded perspective view about the cooking pot of the seventh embodiment of the present invention.
Figure 20:
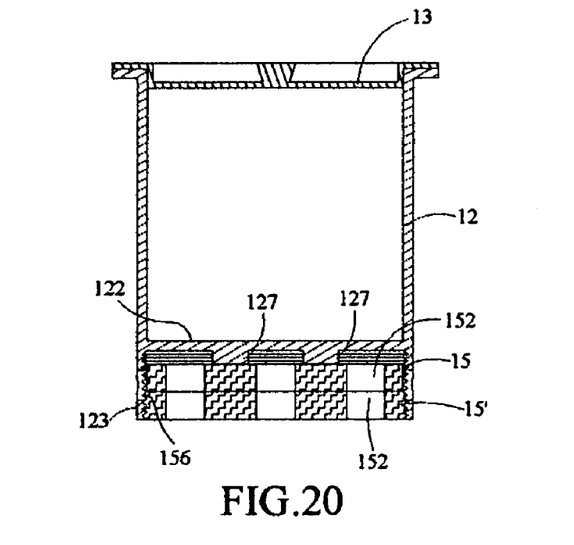
FIG. 20 is a schematic cross view about the cooking pot of the seventh embodiment of the present invention.

With reference to FIGS. 19, 20, the seven embodiment of the present invention is illustrated. The difference of this embodiment from the above embodiments is that an inner wall of the safety ring 123 under the bottom 122 has inner threads 126 which can be screwed to outer threads of the heat accumulating disk 15' so that the heat accumulating disk 15' is hidden within the safety ring 123. Furthermore, the safety ring 123 has a plurality of via holes 128 which is helpful to the air convection in burning. Moreover, a periphery of the heat accumulating disk 15' is installed with a guide hole 157 other than the via hole 152.

Next, when a plurality of heat accumulating disks 15, 15' are stacked, only the lowest heat accumulating disk 15 is necessary to be installed with outer threads for screwing with the inner thread 126 of the safety ring 123, while the edges of other heat accumulating disks 15 are unnecessary to be installed with outer threads.

Moreover, the heat accumulating disks 15, 15' are installed with a plurality of through holes 152. When the heat accumulating disks 15', 15' are stacked and the through holes 152 are aligned, fire can pass through the through hole to the bottom 122. When the gas not burned completely contacts a heated accumulating ring, the gas almost burns completely or the accumulating carbons on the bottom 122 can be reduced. Besides, the lower surface of the bottom 122 can be added with protrusion 127 for stopping the heat accumulating disk 15 or heat accumulating disk 15' so as to have a predetermined distance to the bottom 122.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claim is:

1. A smolder pot capable of cooking food as a heat source is removed, the smolder pot comprising:
   a cooking pot;
   at least one heat accumulating disk being fixed to a center of a bottom of the cooking pot; the heat accumulating disk being retained with a gap from the bottom.

2. The smolder pot as claimed in claim 1, wherein a central screw rod below the cooking pot is screwed into a screw hole in a center of the at least one heat accumulating disk.

3. The smolder pot as claimed in claim 1, wherein a center nut below the cooking pot is screwed by a screw rod at a center of a top of the heat accumulating disk.

4. The smolder pot as claimed in claim 2, wherein a plurality of heat accumulating disks are stacked; a center of one lowest heat accumulating disk of the plurality of heat accumulating disk has a screw hole for screwing a screw rod below the cooking pot; and other heat accumulating disks have respective central through holes for being passed by a stud.

5. The smolder pot as claimed in claim 2, wherein a plurality of heat accumulating disks are stacked; a center of each heat accumulating disk has a through hole; a stud passes through the through holes; and a lowest end of the screw rod is screwed with a nut.

6. The smolder pot as claimed in claim 3, wherein a plurality of heat accumulating disks are stacked; a screw rod at a top center of at least one of the heat accumulating disk screws into a screw hole at a central bottom surface of at least one of the heat accumulating disks.

7. The smolder pot as claimed in claim 1, wherein the heat accumulating disk is installed with a plurality of via holes; wherein fire can pass through the plurality of via hole to burn the bottom of the cooking pot.

8. The smolder pot as claimed in claim 2, wherein a bottom end of the central screw rod is a cambered end.

9. The smolder pot as claimed in claim 2, wherein a top end of the central screw rod has a top block with a predetermined thickness.

10. A smolder pot capable of cooking food as a heat source is removed, the smolder pot comprising:
   a cooking pot;
   a safety ring below a bottom of the cooking pot; an inner wall of the safety ring having inner threads
   at least one heat accumulating disk; one of the at least one heat accumulating disk having outer threads at an outer edge thereof; the at least one heat accumulating disk being fixed to a center of a bottom of the cooking pot; the heat accumulating disk being retained with a gap from the bottom.

11. The smolder pot as claimed in claim 10, wherein a plurality of heat accumulating disks are stacked; only a lowest one of the heat accumulating disks have outer threads for screwing with the inner threads of the safety ring.

12. The smolder pot as claimed in claim 10, wherein a bottom of the cooking pot has a protrusion so that a gap is formed between the heat accumulating disk and the bottom of the cooking pot.

* * * * *